United States Patent Office 3,378,452
Patented Apr. 16, 1968

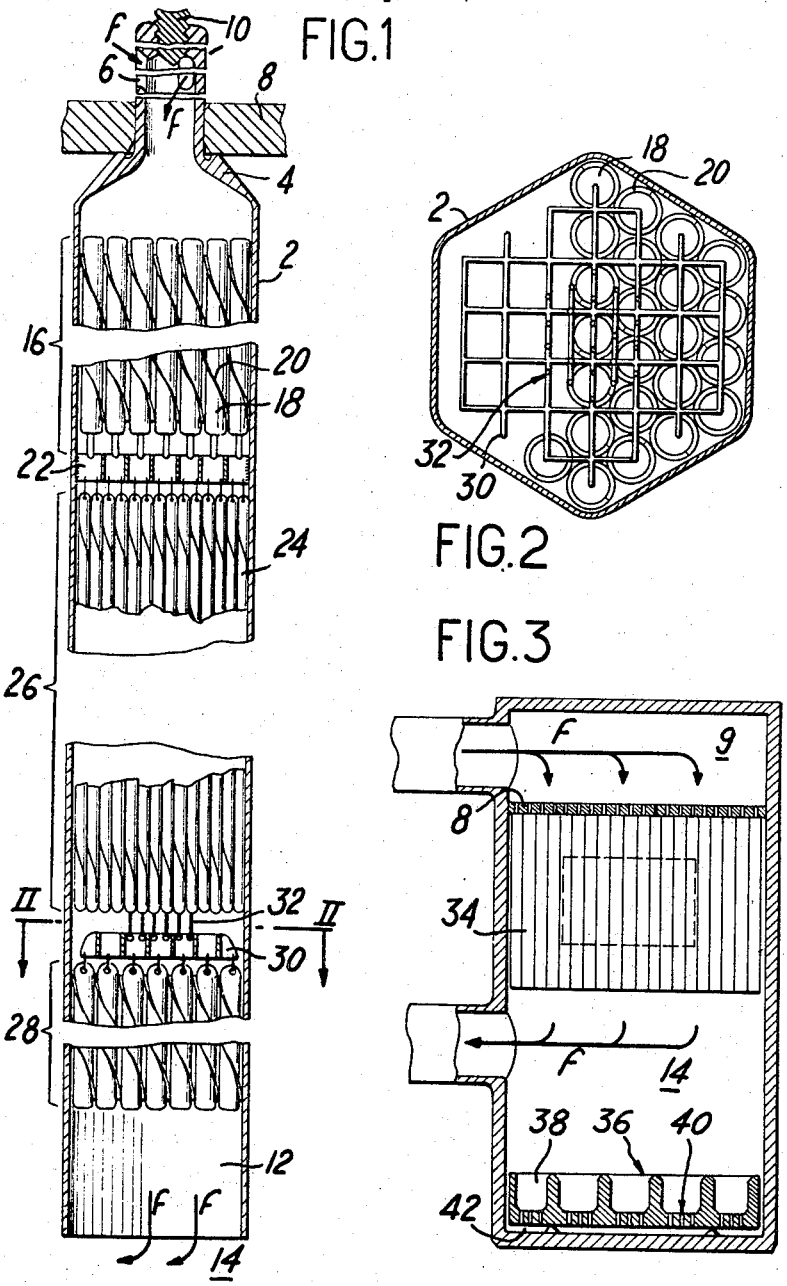

3,378,452
FUEL ASSEMBLY FOR FAST NUCLEAR REACTORS
Didier Costes, Paris, France, assignor to Commissariat à l'Énergie Atomique, Paris, France
Filed Sept. 14, 1966, Ser. No. 579,256
Claims priority, application France, Oct. 8, 1965, 34,364, Patent 1,443,907
5 Claims. (Cl. 176—40)

ABSTRACT OF THE DISCLOSURE

A fuel assembly for a fast reactor has the lowest fuel rod cluster suspended from the cluster located above it. The clusters are mounted in a sleeve having a bottom opening large enough for the lowest cluster to fall freely upon failure of the suspension cluster.

This invention is directed to a fuel assembly for fast reactors which are cooled by a circulation of liquid metal.

The term "fast reactor" is understood to mean a nuclear reactor that operates with fast fission neutrons which are absorbed by the various fissile, fertile and neutron-absorbing materials prior to being slowed down to a substantial extent by neutron-moderating materials; as a rule, these reactors are cooled by a circulation of liquid metal (usually sodium). The reactor core proper, which contains a high proportion of fissile nuclei, is surrounded by a breeder blanket which is primarily composed of fertile material.

In power reactors of this type, the fissile and fertile materials are usually enclosed within steel fuel pins which are juxtaposed so as to form bundles or clusters and a liquid metal coolant is circulated within vertical assemblies, each assembly being made up of a sleeve (usually of stainless steel) containing an upper cluster, a lower cluster which constitutes the breeder blanket, and a central cluster which constitutes the core. There is located at one end of the sleeve a device for securing this latter to a liquid-metal feed box. In the majority of prior art designs, the liquid metal penetrated into the assembly through a calibrated inlet and was discharged from an outlet of larger cross-sectional area.

A study of the accident conditions which are liable to arise in reactors of this type reveals in particular that the following dangers have to be guarded against:

Boiling of the sodium which may arise, for example, as a result of a drop in the rate of flow of sodium through an assembly. By reason of the high specific volume of sodium vapor at the low pressures which are employed, the sodium vapor is liable to form an obstruction which limits the rate of flow through the fuel assembly to a very low value, thereby resulting in very rapid heating of the fuel pins on account of the high specific power;

"Melt-out" which occurs, for example, when the accident condition mentioned above develops progressively in a lateral direction from one fuel assembly to another as a result of the heat conductivity of the core materials, or alternatively when a general failure occurs in the sodium supply. The molten materials may flow down to the diagrid and then form a layer of high density and rapidly increasing reactivity; this results in a power excursion which, in the case of a high-power reactor, may be estimated in some instances to correspond to the explosion of several tons of conventional high explosive.

The present invention is directed to a fuel assembly which is designed for use especially in fast reactors of the type noted above and which meets practical requirements more effectively than the fuel assemblies of the prior art, especially insofar as it gives rise to less danger of melt-out as a result of sodium boiling and practically no explosion hazard after the occurrence of melt-out.

To this end, the invention proposes a fuel assembly of the type comprising a cylindrical sleeve in which are disposed a plurality of superposed clusters of pins formed of fissile and/or fertile material, wherein said sleeve terminates at the lower extremity thereof in an opening having a cross-sectional area which is substantially identical with the cross-sectional area of said sleeve and opens into a space for the collection of coolant, and wherein the bottom cluster is slidably mounted in said sleeve and is suspended from pins which are loaded with fissile material and form part of that cluster which is located directly above the bottom cluster.

The invention additionally consists in other arrangements which are preferably employed in conjunction with the foregoing but which may be employed independently thereof. All of these arrangements will become more readily apparent from a perusal of the following description of one mode of application of the invention which is given by way of example and not in any limiting sense, reference being made to the accompanying drawings, in which:

FIG. 1 is a diagrammatic view of the fuel assembly, this view being taken in cross-section on a vertical plane which passes through the axis;

FIG. 2 is a transverse sectional view taken along line II—II of FIG. 1 and showing the grid which serves to support the fuel pins of the lowermost cluster; and FIG. 3 is a highly diagrammatic and simplified view of a reactor which is equipped with the fuel assemblies shown in FIGS. 1 and 2.

The fuel assembly which is illustrated in FIGS. 1 and 2 comprises a tubular sleeve 2 of hexagonal cross-section and fabricated from stainless steel, the upper extremity of which is closed by a plug 4 provided with inlets 6 for the admission of the sodium which is employed as coolant. One face of said plug 4 is applied against the bottom wall 8 of a box 9 for the supply of pressurized sodium, as shown in FIG. 3; the system of attachment may especially be of the type described in French patent application No. PV 34,366, now French Patent No. 1,443,907 granted to Commissariat a l'Energie Atomique; the system which is illustrated differs therefrom in that it comprises a threaded rod 10 which is operated from the top. The lower end 12 of the sleeve opens into the bottom space 14 in which the heated sodium is collected after discharge from the core.

The fuel assembly comprises in turn, from the top downwards, a top blanket cluster 16, a central cluster 26 (the juxtaposition of the central clusters constitutes the reactor core) and a bottom cluster 28.

The blanket cluster 16 is made up of thirty-seven fertile pins such as the pin 18; there is formed on each pin a helical fin 20 which has a long pitch and which serves to maintain the spacing between said pin and adjacent pins.

The lower end of each fertile pin 18 is attached to a support grid 22 which is welded to the sleeve 2. An alternative form of construction (which is not shown in the drawings) consists in suspending the pins 18 from a grid, but both forms of construction are conventional.

The support grid 22 of the embodiment which is illustrated is adapted to carry the central cluster 26 which is made up of fuel pins 24 of smaller diameter and larger number, said pins being each provided in addition with a helical spacing fin.

The fuel pins 24 are usually filled with a ceramic fuel having a high melting point and which does not contribute to the mechanical strength of the pin cladding (which is usually of stainless steel). However, it is also possible to make use of pins of the type in which the fuel is rigid and bonded to the can so that the thermal expansion of the fuel is imparted thereto to a partial extent. In this type of fuel pin, which has been designed up to the present time with a view to increasing the temperature coefficient of the reactor, it is possible to employ sintered cermets or alternatively a metal alloy. In the event of insufficient cooling or of a power excursion, these types of fuel pins melt before the others, in the first place by reason of the fact that the fuel material of which they are formed has a lower melting point than that of a pure ceramic material and in the second place by reason of the fact that thermal conduction is excellent and that the heat which is necessary to melt the can is thus generated at a higher rate.

In the fuel assembly which is contemplated by the invention, both the structural design of the lower portion of the sleeve and the mode of assembly of the bottom cluster 28 are original concepts, the constructional arrangement of the bottom cluster being similar to that of the top cluster. On the one hand, the bottom opening of the sleeve 2 has a cross-sectional area which is substantially equal to the cross-sectional area of the section containing the fuel pins in order that nothing may obstruct the fall of pins in the event of accidental release.

Furthermore, the bottom cluster 28 is suspended from a grid 30 which is in turn suspended from a certain number of fuel pins 24 of the central cluster 26, said central pins being preferably of the type consisting of rigid fuel which is bonded to the can as hereinabove described. The grid 30 which is illustrated in FIG. 2 is attached by means of twenty-four suspension rods such as the rod 32 to twenty-four fuel pins 24 of the central cluster.

The unit which is composed of sub-assemblies such as the blanket sub-assembly 2 (which may be surrounded if necessary by other sub-assemblies containing fertile material only) constitutes a core and breeder unit 34 (as shown in FIG. 3) which is located vertically above the bottom collector space 14. The space 14 can be so dimensioned as to permit the installation of a fuel handling machine, for example of the type described in French patent application No. PV 34,365, now French Patent No. 1,463,906, as filed by Commissariat a l'Energie Atomique on Oct. 8, 1965.

The bottom portion of the space 14 is taken up by a structure 36 for receiving materials which may drop from the core in the event of accident (especially meltout). Said structure 36 is provided with partitions of known type for the purpose of preventing the formation of critical concentrations. Said partitions may be designed, for example, so as to form a series of cavities 38 separated by walls which are of sufficient thickness and which absorb fast neutrons. The partitions referred to are usefully completed by a system for the purpose of assisting natural convection of heat and for the purpose of cooling the relatively spongy mass formed by the resolidified materials which release substantial residual power; by way of example, FIG. 3 shows communication ducts such as the duct 40 which have a small cross-section and serve to connect the bottom of each cavity 38 to a bottom space 42 which communicates with the collector space 14.

The performance of the fuel assembly in accordance with the invention in the event of insufficient cooling or of a power excursion can be summarized as follows:

Reduction in coolant flow results in sodium vapor blockage in the central cluster 26 (in which the specific power is considerably higher than in the blanket clusters), which is followed by a sharp temperature rise in the fuel. The vapor obstruction (or flow stagnation) propagates rapidly to the bottom cluster and the pressure gradient in the stagnant vapor combines with the action of gravity to force the vapor downwards.

As soon as the pins from which said cluster are suspended have softened to a sufficient extent as a result of the temperature rise, the lowermost cluster is therefore displaced downwards and there is nothing to prevent said cluster from falling down to the space 14 which is filled with sodium at moderate temperature, then down to the collecting cavities of the structure 36. The removal of the bottom blanket cluster accordingly results in a drop in reactivity. Should a generalized accident condition arise, the removal of a number of clusters would accordingly ensure reduction of the neutron reaction to zero in the improbable event of failure of the other safety systems.

The method whereby the bottom blanket subassembly is suspended from the pins of the central fuel cluster has a further advantage in that it increases the negative temperature coefficient of the reactor; in order to enhance this effect, it is of course an advantage to fabricate said fuel pins from materials which have a high coefficient of expansion. This is a further reason for the use of rigid fissile materials (in the form of sintered cermets or metal alloys) within a can which is bonded to the material.

Finally, it should be noted that the fuel assemblies are usually loaded by inserting them in the core from underneath. Consequently, any failure of the charge/discharge machine followed by dropping of an assembly would result in a reduction in reactivity, thus constituting a further advantage from a safety standpoint.

What I claim is:

1. A nuclear fuel assembly for fast reactors which are cooled by a circulation of liquid metal comprising a plurality of superposed clusters of pins formed of canned fissile and fertile material, a cylindrical sleeve having a vertical axis, said clusters being disposed within said sleeve, a bottom opening for said sleeve the cross-sectional area of said opening being substantially identical with the cross-sectional area of said sleeve, the bottom cluster sliding within said sleeve and being suspended from pins loaded with fissile material forming a part of the cluster located directly above the bottom cluster, a grid supporting the pins of the bottom cluster, said grid being suspended from a portion only of the pins of the cluster located directly above the bottom cluster, said pins being in extension under load.

2. A nuclear fuel assembly in accordance with claim 1, wherein the pins which retain the bottom fuel cluster contain solid fissile material which is bonded to the can while the other pins of the same cluster contain fissile material which is not bonded to the can.

3. A nuclear fuel assembly in accordance with claim 1, wherein said fuel assembly is suspended at the top portion thereof and a flow of liquid metal coolant is circulated downwardly through said assembly.

4. A nuclear reactor comprising fuel assemblies in accordance with claim 1 and a bottom collecting structure, cavities in said structure separated by neutron-absorbing walls collecting the pins of said bottom clusters of the fuel assemblies upon melt-out.

5. A nuclear fuel assembly for liquid metal cooled fast neutron reactors comprising a vertical tubular sleeve, a cluster of pins of canned fertile material in said sleeve, a second cluster of pins of canned fissile material retained in said sleeve and located directly above said bottom cluster, a bottom opening for said sleeve having a cross-sectional area substantially identical with the cross-section of said sleeve, said bottom cluster being suspended from suspension pins of said second cluster and sliding as a whole out of said sleeve upon failure of said suspension pins.

References Cited

UNITED STATES PATENTS

| 3,238,105 | 3/1966 | McNelly | 176—40 X |
| 3,271,260 | 9/1966 | Noderer | 176—40 X |
| 3,287,231 | 11/1966 | Frisch | 176—40 X |
| 3,305,452 | 2/1967 | Remoleur | 176—38 X |

FOREIGN PATENTS

| 826,228 | 11/1956 | Great Britain. |
| 930,070 | 2/1960 | Great Britain. |

REUBEN EPSTEIN, *Primary Examiner.*